United States Patent [19]

Marchionda

[11] Patent Number: 4,555,338

[45] Date of Patent: Nov. 26, 1985

[54] OIL SPILL COLLECTOR

[76] Inventor: Tony Marchionda, 708 Fifth St., Struthers, Ohio 44471

[21] Appl. No.: 658,999

[22] Filed: Oct. 9, 1984

[51] Int. Cl.⁴ ............................................. B01D 17/02
[52] U.S. Cl. .................................. 210/242.4; 210/924
[58] Field of Search ................... 210/242.4, 924, 242.3

[56] References Cited

U.S. PATENT DOCUMENTS

| | | | |
|---|---|---|---|
| 3,539,508 | 11/1970 | Bulkley et al. | 210/242.4 |
| 3,546,112 | 12/1970 | Will et al. | 210/242.4 |
| 3,576,257 | 4/1971 | Yates | 210/242.3 |
| 3,617,555 | 11/1971 | Ginsburgh et al. | 210/242.4 |
| 3,617,556 | 11/1971 | Cole | 210/242.4 |
| 3,643,804 | 2/1972 | Sharpton | 210/242.4 |
| 3,667,608 | 6/1972 | Burroughs et al. | 210/242.4 |
| 4,033,876 | 7/1977 | Cocjin et al. | 210/242.3 |
| 4,178,247 | 12/1979 | Janson | 210/242.3 |
| 4,514,299 | 4/1985 | Ayroldi | 210/242.4 |

FOREIGN PATENT DOCUMENTS

| | | | |
|---|---|---|---|
| 2389719 | 12/1978 | France | 210/242.4 |
| 2464335 | 3/1981 | France | 210/242.3 |
| 7812379 | 6/1980 | Netherlands | 210/242.3 |

Primary Examiner—Tim Miles
Attorney, Agent, or Firm—Harpman & Harpman

[57] ABSTRACT

A large buoyant roller having absorbent material on its surface is power driven in alternate clockwise and counter clockwise rotation and located in a buoyant enclosure incorporating movable breakwater members for reducing wave action while admitting oil and water into the enclosure. A movable scraper is arranged for engagement with said absorbent material on said roller when said roller revolves in a clockwise direction for removing oil from the absorbent material.

7 Claims, 3 Drawing Figures

OIL SPILL COLLECTOR

BACKGROUND OF THE INVENTION

1. Technical Field

This invention relates to a novel method and apparatus for skimming pools of oil and other liquid hydrocarbon compounds from water, particularly in water where wave action is present.

2. Description of the Prior Art

Prior structures of this type are best represented by the disclosure of U.S. Pat. Nos. 3,539,508, 3,546,112, 3,617,555 and 3,643,804.

In U.S. Pat. No. 3,539,508, a pair of spaced rollers are rotated in a counter clockwise direction and moved into an oil spill. One of the rollers has a smooth oleophilic surface and the other has a porous deformable surface. Heavy oil is supposed to cling to the smooth oleophilic surface of the one roller and the light oil remaining being soaked up by the porous roller. The scraper blade engaging the smooth roller provides for the separation of oil therefrom and rollers compressing the porous material of the other roller remove oil therefrom.

In the present invention, an absorbable material, such as a thick mat of loosely woven fibers with multiple air spaces therein, collects oil from the water when the roller moves in counter clockwise rotation into and over an oil spill and a blade removes the oil from the absorbent material when the blade is engaged thereagainst and the roller revolved in a clockwise direction.

In U.S. Pat. No. 3,546,112, an absorption oil skimmer is disclosed having a porous surface and rollers for compressing or distorting the porous surface to remove oil therefrom.

In U.S. Pat. No. 3,617,555, an endless belt has a brush-like surface with a plurality of projecting bristles for ensnaring debris and picking up oil. Debris and oil are removed by a scrapper and in U.S. Pat. No. 3,643,804 an endless belt having an affinity for oil is trained over rollers so that a portion of the belt moves into and upwardly out of an oil spill and conveys the oil to a discharge point.

None of the prior art provides any apparatus which will operate when there is any wave action which is a common condition in oil spills in the open sea.

The present disclosure, while utilizing a buoyant roller which is partially submerged in the water and moves into and through an oil spill thereon, is enclosed in a substantially large breakwater through which water and the oil of the oil spill readily move while the breakwater reduces the wave action and permits the roller to effectively collect the spilled oil. In calm seas, forward portions of the portable breakwater are movable outwardly, oppositely away from one another and form buoyant guides serving to direct increased quantities of oil in an oil spill into the area of the collection roller.

SUMMARY OF THE INVENTION

An oil spill collector comprising a large roller having a surface formed of material that will absorb and/or collect and hold oil when the roller is moved into an oil spill, is power driven in alternate clockwise and counter clockwise rotation and provided with a blade for engaging the absorbent material and removing oil therefrom when revolving in a clockwise direction. The large roller is enclosed in a substantially larger, portable buoyant breakwater of a size and shape effectively reducing wave action and creating relatively calm water in an oil spill so that the collecting action of the roller and its absorbent material may be effective. The oil spill collector is movably connected with a barge or ship for moving the same into an oil spill and for receiving oil collected therefrom.

DESCRIPTION OF THE PREFERRED EMBODIMENT

Figure 1:
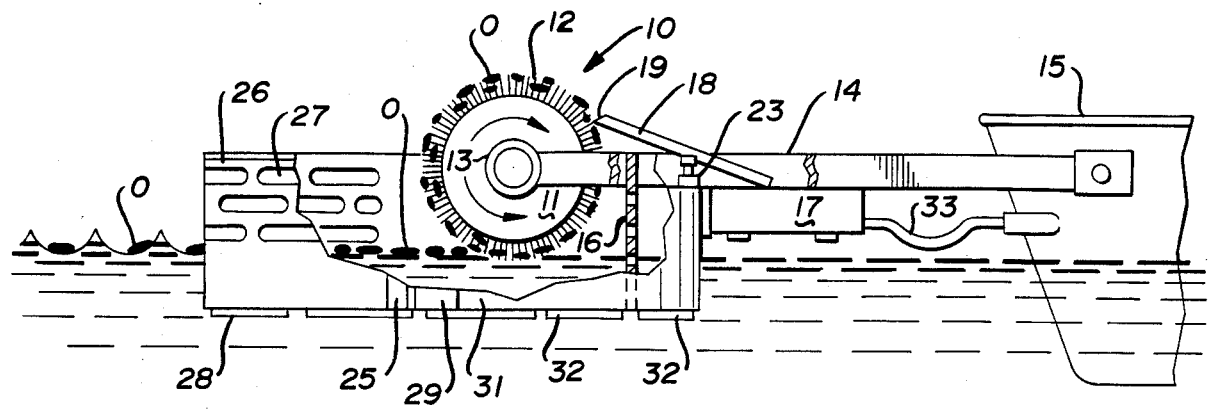
FIG. 1 is a side elevation of the oil spill collector with parts broken away and parts in cross section.

In the form of the invention chosen for illustration herein the oil spill collector comprises a large roller, for example ten feet in diameter and thirty feet long, generally indicated at 10 in the figures in the drawing and having closed ends 11 and a thick surface formed of absorbent material 12, such as loosely arranged fibers having a multitude of air spaces therein, the fibers being relatively small and presenting a large surface area to which oil readily adheres.

The roller 10 is rotatably supported in journals 13 on the ends of a movable support frame 14. The opposite ends of the movable support frame 14 may be pivotally attached to a boat or barge 15 so that the oil spill collector may be moved thereby into an oil spill.

An apertured fixed partition 16 extends transversely of the movable support frame 14 in spaced relation to the roller 10 and a collector blade 18 in the form of an angularly disposed chute is adjustably positioned on the movable support frame 14, the collector blade 18 being substantially wider at its uppermost edge 19 than its lowermost edge 20.

The collector blade 18 is preferably semi-triangular in shape and provided on its opposite sides and on part of its lower edge with upstanding flanges 21 arranged so that oil received from the absorbent material 12 on the roller 10 will flow downwardly to a central area and into an opening 22 in a receiving tank 17. Means for moving the collector blade 18 in a tilting action so as to move its upper edge 19 toward and away from the absorbent material 12 comprise a pair of hydraulically actuated piston and cylinder assemblies 23 which are carried on the movable support frame 14. Remote controls, not shown, alternately raise and lower the collector blade 18 with respect to the absorbent material 12 as hereinafter described. Portions 24 of the movable support frame 14 extend forwardly of the journals 13 which support the roller 10 and are provided with vertical hinge constructions 25 to which a pair of buoyant, curved, movable breakwater sections 26 are pivotally affixed. The movable breakwater sections 26 are preferably apertured as at 27 and their vertically standing wall-like bodies are supported on floats 28.

Movement imparting devices 29 are positioned adjacent the vertical hinges 25 and arms 30 extend from the devices 29 to the respective movable breakwater sections 26.

Figure 2:
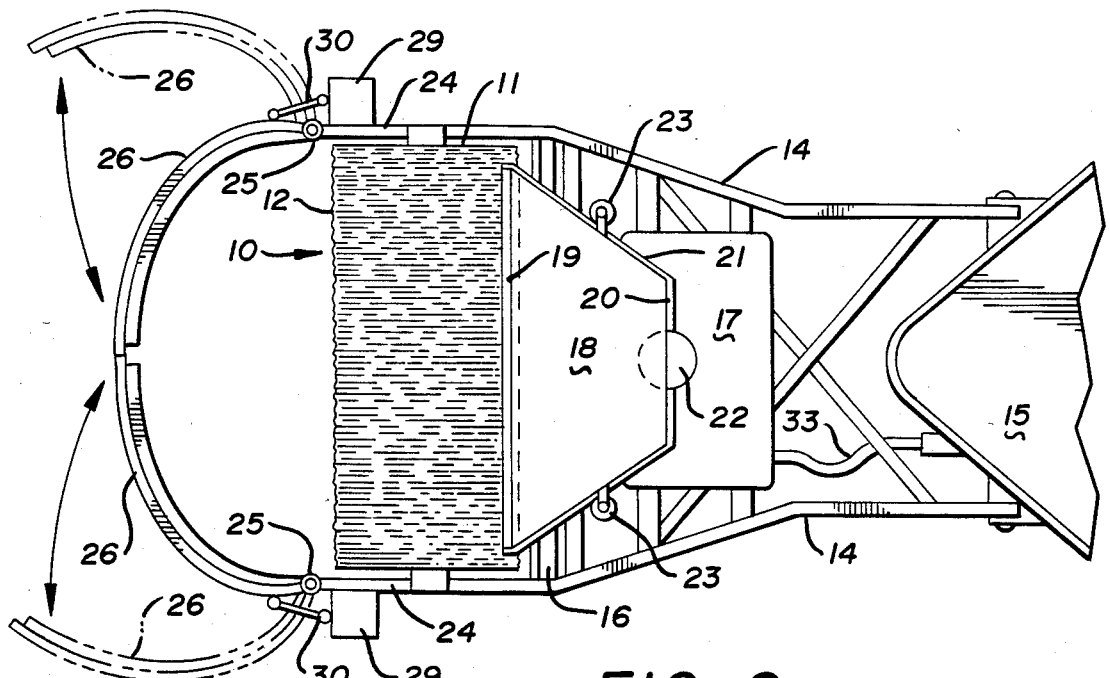
FIG. 2 is a top plan view of the oil spill collector.
Figure 3:
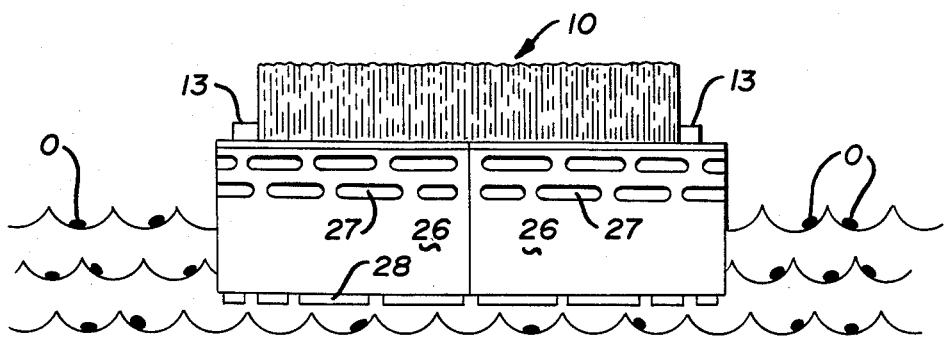
FIG. 3 is a front elevation of the oil spill collector.

By referring to FIG. 2 of the drawings, it will be seen that the movable breakwater sections 26 may be moved to opposite, outwardly positioned locations as shown in broken lines when they are not needed as breakwaters. In such outward or open position the movable breakwater sections 26 become guides directing oil in an oil spill toward the roller 10 and its absorbable material 12. In closed position, as shown in FIGS. 1 and 3 of the drawings, the movable breakwater sections 26 completely protect the roller 10 and its absorbent material 12 from wave action while the apertures 27 permit water and oil to flow into the enclosed area and into engagement with the absorbent material 12 on the roller 10.

Oppositely disposed vertically positioned breakwater extensions 31 extend downwardly from the movable support frame 14 between the hinge assemblies 25 and the apertured fixed partition 16 heretofore referred to, and additional floats 32 provide desirable buoyancy to the oil spill collector.

The floats 28 and 32 may be and preferably are in communication with a suitable source of air and water so that their relative buoyancy may be controlled, as for example in the event of substantially high waves, the increased buoyancy in the floats 28 and 32 will elevate the entire device relative to the wave action and insure the effectiveness of the movable breakwater sections 26 in providing a relatively calm area in the area defined by the device and in which the roller 10 is operable.

By referring again to FIG. 1 of the drawings, it will be seen that a symbolic representation of oil is shown between the waves, the oil being indicated by the letter O, and that within the broken away portion of the movable breakwater sections 26 the relatively calmer water and the oil O will be seen partially loading the absorbent material 12 on the roller 10 which in its initial collecting action is revolving in counter clockwise direction. During such counter clockwise motion of the roller 10, the piston and cylinder assemblies 13 elevate the collector blade 18 so that its upper edge 19 is spaced with respect to the absorbent material 12 and the oil being collected thereby. When the absorbent material 12 is substantially saturated with the oil, the drive means, which is preferably located in the journals 13, reverses the direction of the roller 10 so that it revolves in a clockwise direction and the remote control means of the piston and cylinder assemblies 23 causes them to lower the collector blade 18 so that it engages the absorbent material 12 on the roller 10. Continued clockwise motion of the roller 10 thus causes the oil in the absorbent material 12 to be removed therefrom and to flow down the collector blade 18 through the opening defined along its lower edge 20 and into the tank 17 from which it may be removed by a suitable tubular connection 33 communicating pump means, storage means, and the like in the ship 15.

It will thus be seen that a novel and efficient oil spill collector has been disclosed which has as its principal point of novelty the provision of suitable buoyant, movable breakwater sections spaced outwardly and forwardly of the collection roller 10. The breakwater sections 26 being apertured, permit water and the oil of an oil spill to flow into the protected area within the breakwater sections 26 where the relatively calm water and the oil floating thereon can be effectively collected by the absorbable material 12 on the roller 10 and removed as heretofore described.

Having thus described my invention, what I claim is:

1. Apparatus for removing oil from the surface of a body of water comprising:
spaced mounting means at least partially above the body of water, a cylindrical roller journaled for rotation between said mounting means, said cylindrical roller having a porous deformable surface material partially submerged in the body of water, a breakwater extending from said spaced mounting means at least partially above said body of water and enclosing an area extending outwardly from said cylindrical roller, a collector blade adjacent said cylindrical roller for removing and collecting oil adhering to said absorbent material, means for rotating said cylindrical roller so that said absorbent material contacts the oil and moves the same beneath the water's surface and inunder said cylindrical roller and means for reversing said rotation of said cylindrical roller and engaging said collector blade on said absorbent material.

2. The apparatus for removing oil from the surface of a body of water set forth in claim 1 and wherein said breakwater consists of a pair of vertically standing outwardly curving members having apertures therein.

3. The apparatus for removing oil from the surface of a body of water set forth in claim 1 and wherein said breakwater consists of a pair of vertically standing outwardly curving members having apertures therein, vertical hinges interconnecting said vertically standing outwardly curving members and said spaced mounting means.

4. The apparatus for removing oil from the surface of a body of water set forth in claim 1 and wherein said porous deformable surface material comprises a fibrous blanket of loosely associated fibers of diameters such that oil adheres thereto.

5. The apparatus for removing oil from the surface of a body of water set forth in claim 1 and wherein said means for rotating said cylindrical roller and said means for reversing said rotation of said cylindrical roller consists of at least one driving motor on said spaced mounting means in driving relation to said cylindrical roller.

6. The apparatus for removing oil from the surface of a body of water set forth in claim 1 and wherein floats are attached to said breakwater and said spaced mounting means.

7. The apparatus for removing oil from the surface of a body of water set forth in claim 1 and wherein fixed partitions are mounted on said spaced mounting means and transversely thereof and oppositely disposed with respect to said breakwater whereby said partitions and breakwater form an enclosure around said cylindrical roller.

* * * * *